G. EBRILL & T. KIERSEY.
SEPARATION OF CASEIN AND ALBUMIN FROM CREAMERY SEWAGE.
APPLICATION FILED DEC. 4, 1916.
1,229,919.
Patented June 12, 1917.
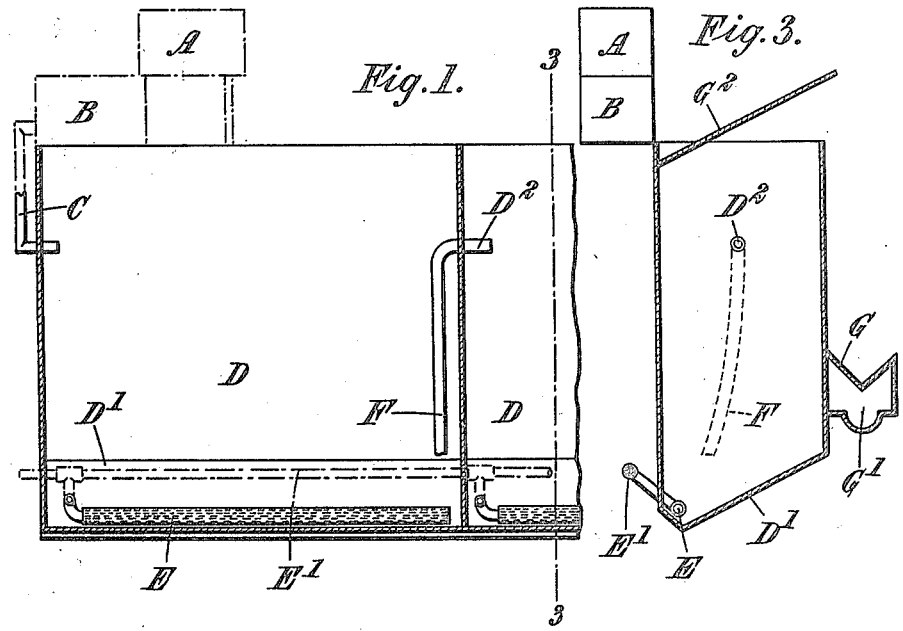
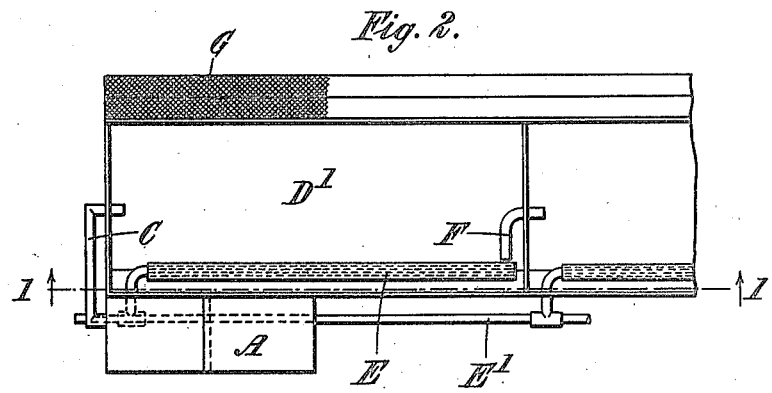
Inventors.
George Ebrill and
Thomas Kiersey.
by Wilkinson, Guesta Mackay,
Attorneys.

UNITED STATES PATENT OFFICE.

GEORGE EBRILL, OF BLACKROCK, AND THOMAS KIERSEY, OF DUBLIN, IRELAND, ASSIGNORS TO EBRILL'S PROCESS LIMITED, OF DUBLIN, IRELAND.

SEPARATION OF CASEIN AND ALBUMIN FROM CREAMERY-SEWAGE.

1,229,919.  Specification of Letters Patent.  Patented June 12, 1917.

Application filed December 4, 1916. Serial No. 135,045.

*To all whom it may concern:*

Be it known that we, GEORGE EBRILL and THOMAS KIERSEY, B. A., B. A. I., T. C. D., subjects of the King of England, residing at Blackrock, county Dublin, Ireland, and Dublin, Ireland, respectively, have invented certain new and useful Improvements in the Separation of Casein and Albumin from Creamery-Sewage, of which the following is a specification.

This invention is for improvements in and relating to the separation of casein and albumin from creamery sewage.

It has previously been proposed to recover nitrogenous substances such as casein from creamery waste by treating the waste with a saturated solution of lime, or any suitable chemical agent, for the precipitation of the casein and promoting the chemical action by passing the liquid through a centrifugal machine of the kind used for filtering or water-extracting, and thence into a suitable receptacle in which the insoluble particles, formed by the chemical action mixed with the air-bubbles caused by agitation in the machine, rise to the surface as a froth or scum which may be removed by screening or otherwise, whereby the casein is recovered.

It will be understood that "creamery sewage" throughout this specification is intended to include milk or milk derivatives, that is to say, it may be whole milk such as is lost in the fat-separating process, or it may be butter-milk or butter-washings, etc.

According to this invention no centrifugal machine is required and the process for the extraction of casein and albumin from creamery waste consists in first adding a substance to precipitate out of solution the casein or albumin, and then blowing a gas, say air, in an extremely finely-divided state (such as is obtainable by forcing it through carbon) through the liquid to float the precipitate before the latter has time to settle.

As applied to the extraction of albumin from creamery sewage, the process is characterized by the use of an alkali as the means for forming a precipitate of the albumin and the air or other gas being blown through the liquid during such time as the albumin is being changed from an acid to an alkaline condition.

It is found that although the albumin can to some extent be formed into a precipitate by the employment of an acid, it is quickly re-dissolved in the acid, so that the use of an acid to form the precipitate is not satisfactory, but the change from an acid condition to an alkaline condition being slower, enables the albumin to be extracted from the liquid during this interval of change.

In applying the process an acid may be first used to form a precipitate of the casein, and then after the extraction of the casein, an alkali may be added to form a precipitate of the albumin.

The invention also refers to apparatus for carrying out the process, and one method of carrying out the invention as applied to the treatment of creamery sewage will now be described with reference to the accompanying diagrammatic drawings, in which:—

Figure 1 is a part longitudinal vertical section through a series of aerating vats, taken on line 1—1 on Fig. 2, and showing an end vat and part of a contiguous one, with covers removed;

Fig. 2 is a plan of the parts shown in Fig. 1, and

Fig. 3 is a vertical transverse section on line 3—3, Fig. 1.

The same letters indicate the same parts throughout the drawings.

The apparatus comprises a tank A for acid and a tank B set at a lower level, so that the acid can be run into the tank B which is to be supplied with the sewage to be treated. A conduit C extends from the tank B and discharges into the first of a series of vats D in which the recovery of material from the sewage is to take place. The bottom of each vat is sloped up at $D^1$ from front to back, as viewed in Fig. 1, and at the lower portion of the slope an aerating element E is provided. This element runs along the whole length of the vat and is in the form of a hollow body of porous material. A conduit $E^1$ supplies air under pressure to the element E. The first vat D communicates with the second vat D by a conduit F which extends down near to the bottom of the first vat but discharges into the second vat at the same level as the conduit C.

Each vat is provided at the top with an upwardly inclined baffle $G^2$, the front edge of which may be hinged to the front wall of the vat, but the back edge which lies higher than the front edge extends above and beyond the back wall of the vat as clearly shown in Fig. 3. Secured to the back wall of the vat and near the bottom of the same is a trough-shaped strainer G beneath which is a trough or gutter G¹. The gutter with the strainer is run along the whole series of vats.

The operation of this process is as follows:—

Supposing the vats D to be all full with creamery waste, the supply is maintained by the creamery waste being continuously fed into the tank B whence it flows by the conduit C into the first vat D and then from that vat through the conduit F to the second vat and so on throughout the series.

If the desire is to recover commercial casein, the tank A would be charged with crude sulfuric acid. This is allowed to run into the tank B through any convenient adjustable device so that the rate of feed can be controlled to suit the rate of feed of sewage into the tank B. The tank B thus constitutes a mixing-tank where the acid which is to precipitate the casein mixes with the sewage and the strength of the acid and rate of flow must all be regulated according to the conditions existing on any particular occasion.

A constant flow of air under pressure is maintained through the conduit E¹ to the aerating element E and this is forced out in the form of fine bubbles through the porous material of the element, which, for example may be composed of carbon.

As the bubbles rise, they catch the casein which has been agglomerated or formed into a precipitate by the admixture of the acid with the creamery waste, and floated to the surface where a scum or foam is formed of the massed casein and air-bubbles. As this rises it presses against the underside of the baffle G² and is thereby directed rearward over the back of the vat into the strainer G. The liquid contained in the foam drains through the strainer into the trough or gutter G¹ whence it is carried away and may be further utilized or treated as hereinafter described. The sloped bottom D¹ of the vat helps to maintain a swirling motion of the liquid in the vat as the bubbles ascend the front side of the vat and thereby set up a circulation so that such casein precipitate as is not carried up by the bubbles travels down at the back of the vat and then forward over the sloping bottom to the aerator E where it again comes under the aerating action. If fresh liquid were not continually run into the vat, the operation could be continued until all the casein was carried to the top in the form of foam, but it is preferred to make the process continuous by running it through the vats at such a rate that on leaving the last vat the liquid is freed from casein.

For about 10,000 lbs. of creamery sewage representing about 1,000 lbs. of milk deprived of its natural fats, it has been found that approximately 4.5 lbs. of actual sulfuric acid is necessary for carrying out the operation described. The liquid drained off from the foam collected in the strainers G can in some cases be used to supply the tank A instead of charging this with fresh sulfuric acid.

The operation is practically the same for the recovery of albumin, but in this case the liquid from the last vat D would be run through another series of vats similar in all respects to the vats D but an alkali would be mixed with the liquid instead of an acid prior to the liquid being allowed to enter the vat. For commercial albumin, ordinary lime, quick or slaked, can be used as the alkali. To mix the lime with the liquid from the vats D, the said liquid can be run through a tank containing lime and in which an agitator operates to keep the lime well stirred, and after running through this tank it can be passed into a settling tank to allow any excess of lime to settle. From thence it can be run on through a series of vats similar in all respects to the vats D and provided with aerating means in the same manner, so that the albumin, which the lime would agglomerate or precipitate, will be carried up by the air-bubbles in the form of froth and made to flow over into a strainer having a draining trough beneath it as already described.

In the final recovery of the creamery waste it is usually required to free it from liquid so that the resulting product may be supplied in dry form. If the creamery waste were recovered by merely precipitating it a much larger proportion of liquid would be present in the precipitate than is the case when it is recovered in the form of foam. Thus by recovery according to the present method the precipitate can be freed from liquid by evaporation at a comparatively small cost; moreover, precipitation would not be practicable with the albumin as if left so long as to settle it would redissolve. It is found that the foam is easily dried, which is a considerable asset in the process, because drying, if it had to be prolonged, would become expensive.

The acid liquid drained away from the froth during the recovery of the casein is run into a suitable storage tank and kept separate from the alkaline liquid drained away from the froth during the recovery of the albumin; thus either of these liquids can be used again for treating further creamery waste.

Obviously more than one aerating-element E can be used in each vat if desired, these being placed, for example, at different heights along the sloping bottom D¹.

The liquid should be fed through the alkaline tank at such a rate that on issuing from the settling-tank it is slightly alkaline, which condition is found to be most conducive for the recovery of the albumin, and if this is too fast for the settling process, it must be made intermittent.

It has previously been proposed to force air in a very finely-divided state through an effluent so as to carry up the particles with the scum which could afterward be removed by a scraper, means being provided for the liquid to drain away from the scum, and no claim is made for such a process *per se* but only as applied to a process for the extraction of casein or albumin from creamery waste consisting in first adding a substance to precipitate out of solution the casein or albumin and then blowing a gas, say air, in an extremely finely-divided state (such as is obtainable by forcing it through carbon) through the liquid to float the precipitate before the latter has time to settle. Further, it is well-known to blow air into sewage containing lime so that the sewage may thereby be agitated and the solid matter afterward allowed to settle; also the blowing of air through water has been utilized to agitate the water in the presence of a reagent to precipitate out the undesired contents. Where air is thus used for mixing purposes, it is blown in in bubbles much too large to produce the flotation required according to the present process, and even flotation by minute air bubbles is known, but we believe what is set forth in the appended claims is new.

It will be appreciated that by removing the casein and albumin from creamery effluents, the effluent is largely purified, and as far as the removal of these substances is concerned, is rendered innocuous, which is of importance to owners of works where quantities of the effluent are necessarily discharged.

Throughout this specification and claims the word "precipitate" is used for the substance which is brought out of solution into a solid state, although such substance is floated by the rising air-bubbles instead of being allowed to settle as would ordinarily be the case with a precipitate.

What we claim as our invention and desire to secure by Letters Patent is:—

1. A process for the extraction from creamery waste of casein and albumin contained therein in solution consisting in, adding a substance to precipitate out of solution the material to be extracted and blowing a gas, in an extremely finely-divided state through the liquid to float the precipitate before the latter has time to settle.

2. A process for the extraction from creamery waste of casein and albumin contained therein in solution consisting in, first rendering the creamery waste acid and then adding an alkali to the acidulated waste to precipitate the albumin out of solution, and blowing a gas, in an extremely finely-divided state through the liquid to float the precipitate before the latter has time to settle.

3. A process for the extraction from creamery waste of casein and albumin contained therein in solution consisting in, first adding an acid to precipitate the casein out of solution, blowing a gas, in an extremely finely-divided state through the liquid to float the precipitate before the latter has time to settle, removing the froth thus created which contains the casein and then adding an alkali to precipitate the albumin out of solution, again blowing a gas, in an extremely finely-divided state (such as is obtainable by forcing it through carbon) through the liquid to float the precipitate before the latter has time to settle, and finally removing the froth thus created with the albumin in it.

4. A process for the extraction from creamery waste of casein and albumin contained therein in solution consisting in, adding a substance to precipitate out of solution the material to be extracted and while the said creamery waste and added substance are in a container having a sloping baffle so situated that a free space is provided between the discharge side of the container and the upper edge of the baffle, blowing a gas, in an extremely finely-divided state though the liquid to float the precipitate before the latter has time to settle so that it is discharged in the form of froth through the free space provided between the discharge side of the container and the said baffle.

5. A process for the extraction from creamery waste of casein and albumin contained therein in solution consisting in, adding a substance to precipitate out of solution the material to be extracted, and while the said creamery waste and added substance are in a container having a sloping baffle so situated that a free space is provided between the discharge side of the container and the upper edge of the baffle which upper edge is higher than the discharge side of the container, blowing a gas, in an extremely finely-divided state through the liquid to float the precipitate before the latter has time to settle so that it is discharged in the form of froth through the free space provided between the discharge side of the container and the said baffle.

6. A continuous process for the extraction from creamery waste of casein and albumin contained therein in solution consisting in maintaining a flow of the creamery waste through a series of containers each having a sloping baffle so situated that a free space is provided between the discharge side of the container and the upper edge of the baffle, adding a substance to the creamery waste at the source of flow to precipitate out of solution the material to be extracted, and blowing a gas, in an extremely finely-divided state through the liquid in each container to float the precipitate before the latter has time to settle so that it is discharged in the form of froth through the free space provided between the discharge side of the container and the said baffle.

7. A continuous process for the extraction from creamery waste of casein and albumin which are contained therein in solution consisting in, maintaining a flow of the creamery waste through a series of containers each having a sloping baffle so situated that a free space is provided between the discharge side of the container and the upper edge of the baffle, adding an acid to the creamery waste at the source of flow to precipitate out of solution the casein, and blowing a gas, in an extremely finely-divided state through the liquid in each container to float the precipitate before the casein has time to settle so that it is discharged in the form of froth through the free space provided between the discharge side of the container and the said baffle, continuing the flow of the acidulated creamery waste from the last of the previously-mentioned containers through another series of containers which in all respects are the same as the first series, adding an alkali at the source of flow to the second series of containers to precipitate out of solution the albumin, and blowing a gas, in an extremely finely-divided state through the liquid to float the albumin before it has time to settle so that it is discharged in the form of froth through the free space provided between the discharge side of each container and its baffle.

In testimony whereof we have signed our names to this specification in the presence of two subscribing witnesses.

GEORGE EBRILL.
THOMAS KIERSEY.

Witnesses:
FRANCIS KENNAN,
EDWARD L. ADAMS.